(12) United States Patent
Nishiwaki

(10) Patent No.: US 6,198,846 B1
(45) Date of Patent: Mar. 6, 2001

(54) CHARACTER RECOGNITION SYSTEM

(75) Inventor: Daisuke Nishiwaki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/234,840

(22) Filed: Jan. 22, 1999

(30) Foreign Application Priority Data

Jan. 22, 1998 (JP) .................................................. 10-025126

(51) Int. Cl.$^7$ ...................................................... G06K 9/34
(52) U.S. Cl. ............................ 382/178; 382/203; 382/204
(58) Field of Search ................................... 382/177, 178, 382/181, 186, 203, 204, 209

(56) References Cited

U.S. PATENT DOCUMENTS

| | | | |
|---|---|---|---|
| 5,561,720 | * 10/1996 | Lellmann et al. | 382/178 |
| 5,949,906 | * 9/1999 | Hontani et al. | 382/177 |
| 6,035,059 | * 3/2000 | Kurosawa et al. | 382/164 |

FOREIGN PATENT DOCUMENTS

| | | |
|---|---|---|
| 59-98283 | 6/1984 | (JP) . |
| 62-46390 | 2/1987 | (JP) . |
| 2-271088 | 11/1987 | (JP) . |
| 1-181176 | 7/1989 | (JP) . |
| 2-105982 | 4/1990 | (JP) . |
| 4-65784 | 3/1992 | (JP) . |
| 6-236454 | 6/1994 | (JP) . |
| 6-215182 | 8/1994 | (JP) . |
| 3-225578 | 10/1994 | (JP) . |
| 6-333089 | 12/1994 | (JP) . |
| 7-98747 | 4/1995 | (JP) . |
| 8-16720 | 1/1996 | (JP) . |
| 8-137994 | 5/1996 | (JP) . |

OTHER PUBLICATIONS

Nishiwaki et al. A Segmentation Method for Connected Numerals Using Run Expressions; Chuo University, Tokyo, published in the 1995 Information and Systems Society Conf. of IEICE, Sep. 5–8, 1995.

Tsukumo, Improved Algorithm for Direction Pattern Matching and Its Application for Handprinted Kanji Character Classification; C & C Information Technology Res. Labs, NEC Corporation; vol. 90, No. 74; Jun. 7, 1990.

* cited by examiner

*Primary Examiner*—Phuoc Tran
(74) *Attorney, Agent, or Firm*—Foley & Lardner

(57) ABSTRACT

A separating position candidate detecting unit 21 detects separating position candidates in a character row derived by a character row deriving unit 11. A character candidate separating unit 31 separates character candidates by using the separating position candidates obtained by the separating position candidate detecting unit 21. A newly provided separation shape determining unit 32 determines separation shapes at the same time. A character recognition unit 41 provides a character kind and separation shape of a reference pattern most resembling each separation shape by using a character recognition dictionary 42, in which reference patterns are stored each for each separation shape. A recognition result verifying unit 51 checks character recognition results character candidate patterns provided from the character recognition unit 41 and corresponding separation shapes with reference to a verification rule memory unit 52, in which right recognition result/separation shape combinations allowable to be provided are stored. A pertinent combination is provided as a recognition result. Otherwise, the operation is repeated by deriving a character candidate pattern and the corresponding separation shape by using a different separating position candidate.

16 Claims, 10 Drawing Sheets

「O」 + 「O」
LEFT CONTACT

Fig.3

「O」 + 「O」
RIGHT CONTACT

Fig.4

「O」 + 「O」
MID POINT CONTACT

「6」 + 「?」
LEFT CONTACT

Fig.8

「5」 + 「?」
RIGHT CONTACT

T-TYPE CONTACT POINT

Fig.11

CONSTRICTED POINT

Fig.12

Y-TYPE CONTACT POINT

Fig.13

END-TO-END CONTACT POINT

Fig.14

TWO-POINTS CONTACT

Fig.15

TWO-POINTS CONTACT

Fig.16

| LEFT SIDE RECOGNITION RESULT | RIGHT SIDE RECOGNITION RESULT | SEPARATION SHAPE |
|---|---|---|
| 「0」 | 0 | T-TYPE |
| 「0」 | 0 | LINE CONTACT POINT |
| ⋮ | ⋮ | ⋮ |
| 「5」 | 4 | T-TYPE |
| ⋮ | ⋮ | ⋮ |

Fig.17

| LEFT SIDE RECOGNITION RESULT | RIGHT SIDE RECOGNITION RESULT | SEPARATION SHAPE |
|---|---|---|
| 「0」 | 「0」 | T-TYPE(LEFT→RIGHT) |
| 「0」 | 「0」 | LINE CONTACT POINT |
| ⋮ | ⋮ | ⋮ |
| 「5」 | 「4」 | T-TYPE(LEFT→RIGHT) |
| ⋮ | ⋮ | ⋮ |

SEPARATION CANDIDATES

CHARACTER RECOGNITION SYSTEM

BACKGROUND OF THE INVENTION

The present invention relates to character recognition systems and, more particularly, to character recognition systems for automatically recognizing characters written on paper.

Figure 18:
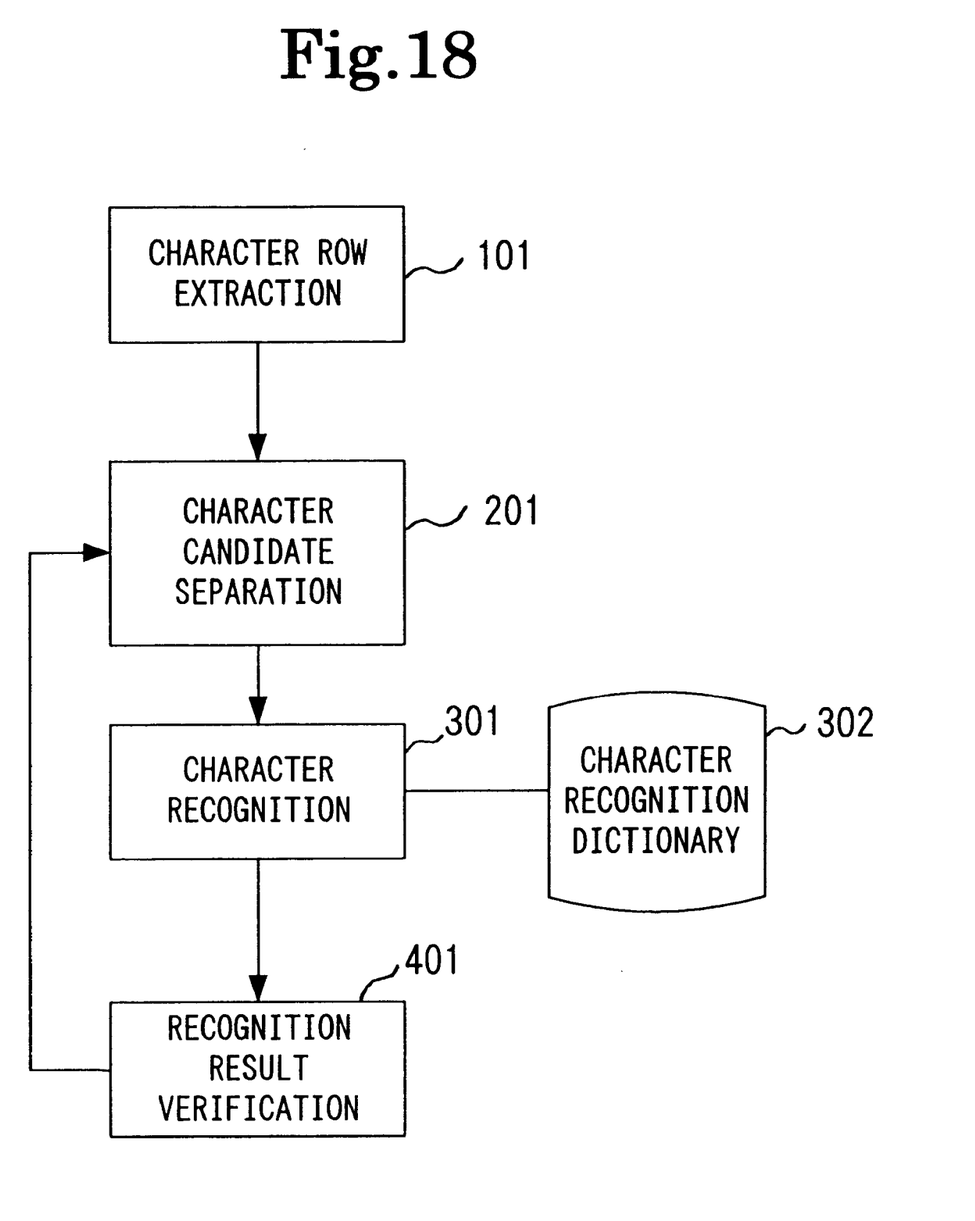
FIG. 18 is a block diagram of a prior art character recognition apparatus.

FIG. 18 shows a system for recognizing characters in contact with one another. In this system, contact portions of characters in a character pattern are detected, and the pattern is separated at the detected contact portions into character candidates, and kinds of the separated character candidates are determined in a character recognition mean.

Specifically, the illustrated character recognition system comprises a character row extracting means 101 for extracting an area of one character row, a character candidate separating means 201 for separating areas each corresponding to one character, a character recognition means 301 for recognizing each character candidate separated in the character candidate separating means 201, and a recognition result verifying means 401 for verifying the result of recognition executed in the character recognition means 301.

Figure 19:
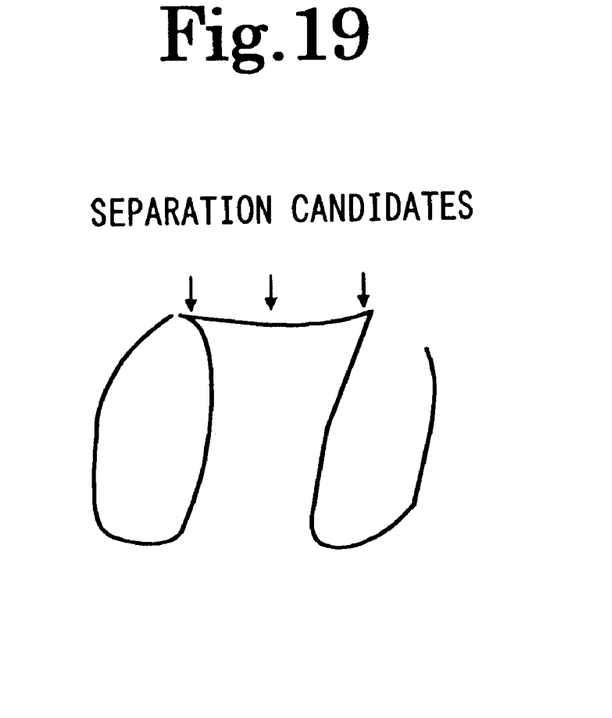
FIG. 19 is a contact character for explaining the operation of prior art character recognition apparatus.

Japanese Patent Laid-Open No. 59-098283 discloses a pattern separating and recognizing system as a first example of the character recognition system having the above construction. In this system, character separation result data which are obtainable for, for instance, a contact character pattern as shown in FIG. 19, as outputs of the character candidate separating means 201 and include incorrect character data, are registered in a character recognition dictionary 302. When a candidate character pattern hits the dictionary obtained from the incorrect character separation result, the character recognition means 301 provides data representing the kind of the hit character and also data representing that the hit character is obtained by separating the pattern at incorrect position, i.e., an incorrect partial pattern. The recognition result verifying means 401 provides recognition result data when and only when it verifies that both the results of recognition of the left and right separated character candidates are not partial patterns.

In FIG. 19, the three arrows show examples of the character candidate separating position. Assuming that the right end arrow represents the correct separating position, when the pattern separation is performed at this position, the means 401 verifies that both the recognition results of the left and right separated character candidates are not partial patterns ("0"), and provides data "00".

Japanese Patent Laid-Open No. 8-16720 discloses a second example of the prior art character recognition system. In this system, the character candidate separating means 201 separates a contact character pattern at a minimal position, which is detected from a horizontal projection profile of a character row pattern. When no minimal position is detected from the profile, the contact character pattern is collectively recognized without separating it. To this end, the character recognition means 301 has a special structure that can collectively recognize, without separation, a pattern which is incapable of being separated by using the projection profile, and reference patterns for contact characters are stored in the character recognition dictionary 302.

Japanese Patent Laid-Open No. 1-181176 discloses a third example of the prior art character recognition system. In this character recognition system, the character candidate separating means 201 includes means for detecting characters not in contact with other characters, and means for detecting the contact characters. In this latter system, unlike the preceding second example of system, the separating position is not absolutely determined by using a pure horizontal projection profile of the character row pattern. Instead, a contact character pattern is divided into two divisions for each pixel in the horizontal direction. A position is then detected, which provides the best mean evaluation value of the recognition results obtained, and the pattern is separated at this position.

In any of the above three prior art character recognition systems, a plurality of separated character candidates are prepared for each contact character pattern, and the best combination of these candidates is selected as a character recognition result.

Figure 20:
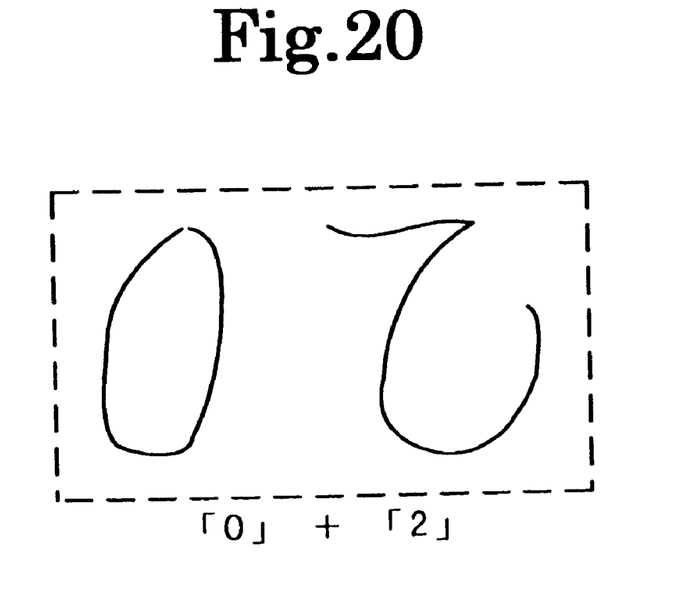
FIG. 20 is characters for describing the way of separated character candidate selection.

However, as shown in FIG. 20, depending on the way of separated character candidate selection, it is possible that the character recognition means recognizes a wrong character as a result of pattern separation at a wrong separating position. In the case of FIG. 20, the character recognition means erroneously recognizes the right character candidate to be figure "2".

As described above, the above prior art character recognition systems have a high possibility that the character recognition means erroneously recognizes a wrong character kind from a character candidate pattern obtained by separating a contact character pattern at a wrong separating position.

SUMMARY OF THE INVENTION

An object of the invention, accordingly, is to provide a character recognition system, which can reduce erroneous reading of the character recognition means, i.e., reduce the possibility that the character recognition means erroneously recognizes a wrong character kind from a character candidate pattern obtained by separating a contact character pattern at a wrong separating position, thus improving the reading performance.

According to an aspect of the present invention, there is provided a character recognition system comprising: a first means for extracting a character row containing contact characters, detecting character separating position candidates in the derived character row and separating areas each corresponding to one character as character candidate patterns from the derived character row; a second means for determining the separation shape of each separated character candidate pattern; and a third means for determining the character kind from each separated separated character candidate and the corresponding separation shape, making a check, on the basis of the character recognition result of each character candidate pattern and the corresponding separation shape, as to whether the combination of the character recognition result and the separation shape is right, and providing the recognition result if the combination is right.

According to another aspect of the present invention, there is provided a character recognition system for detecting contact positions in a contact character pattern containing contact characters, separating character candidates from the contact character pattern at the contact positions thereof as separating positions, and determining the character kind of each character candidate in a character recognition unit, wherein: the shapes of the separating positions are detected when separating the character candidates from the contact character pattern, a character recognition dictionary with reference patterns stored therein is used to provide a character kind and a separating position shape most resembling a reference pattern for each detected separating position shape, and for a combination of a character recognition result and the corresponding separation shape the recognition result is provided if the combination is right.

According to other aspect of the present invention, there is provided a character recognition system comprising: a character row extraction means for extracting a character row containing contact characters; a separating position candidate detecting means for detecting character separating position candidates in the character row derived by the character row deriving means; a character candidate separating means for separating areas each corresponding to one character as character candidate patterns by selecting the separating position candidates detected by the separating position candidate detecting means; a separation shape determining means for determining the separation shapes of the separating position candidates detected by the separating position candidate detecting means; character recognition means for determining character kinds from the character candidate patterns separated by the character candidate separating means and the separation shapes determined by the separation shape determining means for the character candidate patterns; a character recognition dictionary for storing reference patterns to be referred to for the character recognition for individual character kinds and separation shapes; recognition result verifying means for making a check, using the character recognition dictionary and each character candidate pattern recognition result obtained in the character recognition means and the corresponding separation shape, as to whether the combination of the recognition result and the separation shape is right; and a verification rule memory means, in which right combinations of recognition results and separation shapes are stored for the character candidate patterns checked in the recognition result verifying means; wherein: the character recognition means provides, for each separation shape, a character kind most resembling a reference pattern stored in the character recognition dictionary and the separation shape, with reference to the character recognition dictionary with the reference patterns stored therein; and the recognition result verifying means checks combinations of the contact character pattern recognition result provided from the character recognition means and the corresponding separation shapes with reference to the verification rule memory means with the right recognition result/separation shape combinations stored therein, and provides any pertinent combination as a recognition result.

The problem posed by the prior art character recognition system arises from the fact that the character recognition means separates a contact character pattern into character candidates without use of any data concerning the contact character pattern separation. In the invention, this problem is precluded by newly adding, to the prior art character recognition system as shown in FIG. 18, means for detecting shape features with separating a contact character pattern into character candidates, and verification rule memory means, in which right character candidate pattern recognition results and corresponding separation shapes, allowable for being provided as recognition result as a result of recognition result verification, are stored.

Other objects and features will be clarified from the following description with reference to attached drawings.

PREFERRED EMBODIMENTS OF THE INVENTION

Preferred embodiments of the present invention will now be described with reference to the drawings.

Figure 1:
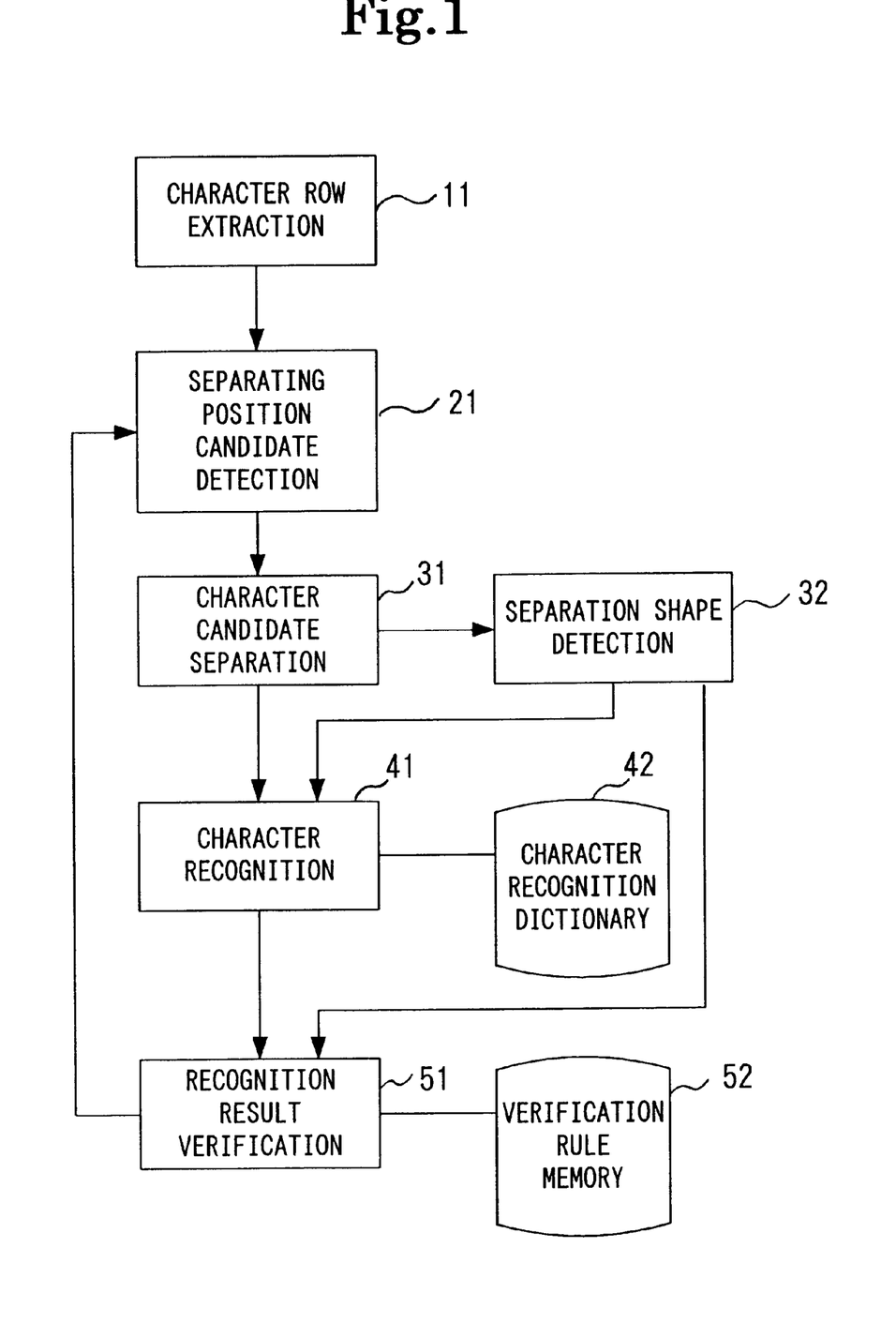
FIG. 1 is a block diagram showing an embodiment of the character recognition system according to the invention.

FIG. 1 is a block diagram showing an embodiment of the character recognition system according to the invention.

The illustrated character recognition system comprises a character row extracting means 11 for deriving a character row pattern including contact characters from an account slip or the like, a separating position candidate detecting means 21 for detecting separating position candidate in the character row derived by the character row deriving means 11, a character candidate separating means 31 for separating areas each considered to correspond to one character by using the separating position candidates detected by the separating position candidate detecting means 21, a separation shape determining means 32 for determining the separation shapes of the character row separation at the detected separating position candidates, a character recognition means 41 for determining character kinds from the character candidate patterns obtained by the character candidate separating means 31 and the separation shapes determined by the separation shape determining means 32, a character recognition dictionary 42, in which reference patterns registered for individual character kinds and separation shapes are stored for being referred to for character recognition, a recognition result verifying means 51 for making a check, using the result of recognition of each character candidate pattern and the corresponding separation shape, obtained by the character recognition means 41, as to whether the combination of the recognition result and the separation shape is right, and a verification rule memory means 52, in which right combinations of the character candidate pattern recognition results and separation shapes checked by the recognition result verifying means 52 are stored.

The operation of the embodiment shown in FIG. 1 will now be described. The separating position candidate detecting means 21 detects separating position candidates for separating a character row pattern derived by the character row derived means 11. The character candidate separating means 31 separates contact character candidates by using a separating position candidate detected in the separating position candidate detecting means 21. At this time, the separation shape determining means 32 also determines the separation shape of the pattern separation at the detected separating position candidate. The character recognition means 41 consults with the character recognition dictionary 42, in which reference patterns are stored each for each separation shape, and provides data of a character kind most resembling a reference pattern and the separation shape. The recognition result verifying means 51 receives the output data of the character recognition means 41, representing the combination of the result of contact character pattern recognition and the separating shape, and then it consults with the verification rule memory means 52, in which combination data allowable for provision as recognition result are stored. If allowable data is found, the means 51 provides this data as recognition result. Otherwise, a different separating position candidate is used to obtain corresponding character candidate pattern and separating shape. This operation is repeated until allowable data is found.

The operation of the embodiment will now be described in greater detail.

The character row deriving means 11 derives a character row area for one character row from an image on an account slip or like paper sheet as the subject of reading. The image input, i.e., photoelectric conversion, may be done using an ordinary scanner. The character row area may be extracted by taking a horizontal and a vertical character image component projection profile and detecting horizontal and vertical high projection value portions. As an alternative, the coordinates of a recognition subject may be preliminarily stored. By so doing, the character row area may be extracted right after the image input done by using the scanner noted above.

The separating position candidate detecting means 21 separates an area corresponding to one character. With a character row image free from contact characters, a character row image projection may be taken perpendicularly to the direction of the character row, and positions of zero projection value may be selected as separating positions. Where characters intrude one another in an intricate fashion so that they can not be separated by using the character projection, areas having continuous character pixels may be detected from a character image, and each made to constitute one character. The continuous character pixel areas may be detected by using labeling. In the case when the separation is impossible even by this method, character patterns are in contact with one another. In this case, the contact character pattern is divided at an adequate position or positions. As the separating position candidate detecting means may be used one described in, for instance, Nishiwaki et al, "Contact Hand-Written Character Separation Recognition Using Run Features", '95 ShingakuZendai, D-185.

FIGS. 10 to 15 show examples of the separated character candidate patterns detected by using this method. In the example shown in FIG. 10, the pattern has a vertical run line portion having a suddenly increasing width. This pattern is referred to be one with T type contact point as separating position candidate. In the example shown in FIG. 11, the pattern has a vertical run length portion which is constricted at the center as separating means candidate. This pattern is referred to be one with constricted point as separating position candidate. In the example shown in FIG. 12, the pattern has a vertical run line portion having a suddenly increasing width in a predetermined range with respect to a certain horizontal position. This pattern is referred to be one with Y type contact point as separating position candidate. In the example shown in FIG. 13, the pattern has a straight vertical run line portion longer than a predetermined length. The mid point of this portion is called end-to-end contact point as separating position candidate.

Figure 14:
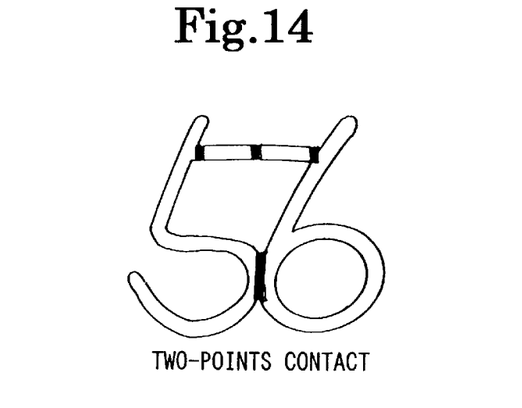
Figure 15:
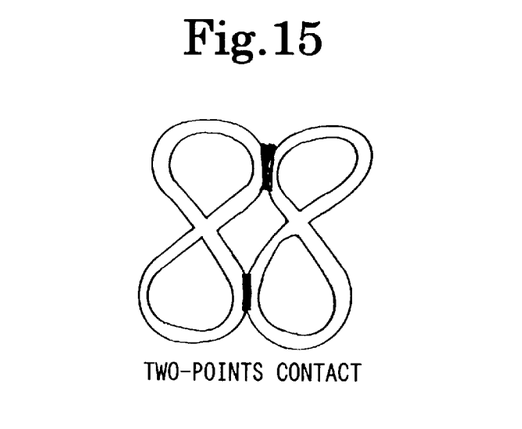

The examples shown in FIGS. 14 and 15 belong to a case when none of the separating position candidates shown in FIGS. 10 to 13 is detected. In these examples, a contact character pattern loop is obtained, and the T type, constricted, Y type and end-to-end contact points as shown in FIGS. 10 to 13 are detected on the basis of the vertical run including the loop uppermost and lowermost points and the vertical run. Two such contact points are then determined as separating position candidates, one as the uppermost one and the other as the lowermost one, and are used for separating the pattern.

The character candidate separating means 31 will now be described. The character candidate separating unit 31 separates areas each corresponding to one character as character candidates from the character row image. When the character candidate separation by the labeling has been ended, the character candidate separating means 31 checks whether each separated block contains contact characters. A block having width W, which is greater than the product of multipliflication of the character row height H by a constant k, is determined to be one containing contact characters.

The character candidate separating means 31 estimates the number of contact characters contained in the block from the width W thereof, and determines the number of separation times. Alternatively, the number of separation times may be determined by dividing the block width W by the character row height H. With a character row, in which the number of digits and entry frame position are known, it is further possible to use the character frame width Wf in lieu of the block width W. After determination of the separation times number, the character candidate separating means 31 separates the character candidate patterns. For example, a contact character pattern with one separation time has two character candidate patterns to be separated, and thus one of the separating position candidates detected by the separating position candidate detecting means 21 is selected for the character candidate pattern separation. Generally, with a contact character pattern with n separation times, (n−1) separating position candidates are selected to obtain character candidate patterns corresponding in number to the separation times number n. The separated character candidate patterns are provided to the character recognition means 41.

The separation shape determining means 32 will now be described. The separation shape determining means 32 determines the separation shapes of the character candidate patterns separated by the character candidate separating means 31. Specifically, the separation shape determining means 32 receives the selected separating position candidate or candidates from the character candidate separating means 31, and provides the names of these separating position candidates, as described before in connection with FIGS. 10 to 15, as separating position data to the character recognition means 41. More specifically, the names of the separating position candidates corresponding to the right and left ends of each character candidate pattern are provided. For example, with a contact character pattern having two contact characters, the left end of the left separated character candidate is not obtained with any separating position candidate. Thus, "null" is provided for this end in the sense that no separating position data is provided for this end. As the separating position data for the right end, the name of the separating position candidate, at which the left character candidate pattern is separated from the right one, is provided.

The character recognition means 41 will now be described. The character recognition means 41 discriminates the character kinds of the character candidate patterns received from the character candidate separating means 31.

As a feature for the discrimination, white-and-black data of pixels constituting the character candidate image may be used. As another example of the discrimination feature to be used, Tsugumo et al, "Improvement and Application to Hand-Written Kanji Character Recognition of Directional Pattern Matching", Shingakukenshi, PRU 90-20, 1990, may be referred to. As a further discrimination method, a pure similarity method may be used. Denoting a reference feature pattern by vector T, the pure similarity S of a feature pattern X obtained from an input pattern is expressed as $$S=(X, T)/|X|\cdot|T| \qquad (1)$$

where (X, T) is the internal product of X and T, and | | is the norm.

As further discrimination methods, it is possible to use well-known character recognition systems, such as one which detects the minimum Euclid distance between the feature vector T of the reference pattern and the feature vector X of the input pattern. As a reference patterns, pattern models are preliminarily stored in the character recognition dictionary 42.

The recognition result verifying means 51 will now be described. The recognition result verifying means 51 receives a separated character candidate pattern recognition result obtained in the character recognition means 41 and also the name of the separation shape of the pertinent pattern, and checks whether the received data is to be provided as a final recognition result. This check is performed with reference to the verification rule memory means 52, in which character recognition results and pertinent separation shapes, obtained by using pattern models and allowable to be provided as final recognition result, are stored.

The recognition result verifying means 51, referring to the verification rule memory means 52, provides the recognition result as the fine one if the same is registered in the verification rule memory means 52. If there is no registration, the same processing is performed for other separation point candidate.

Figure 5:
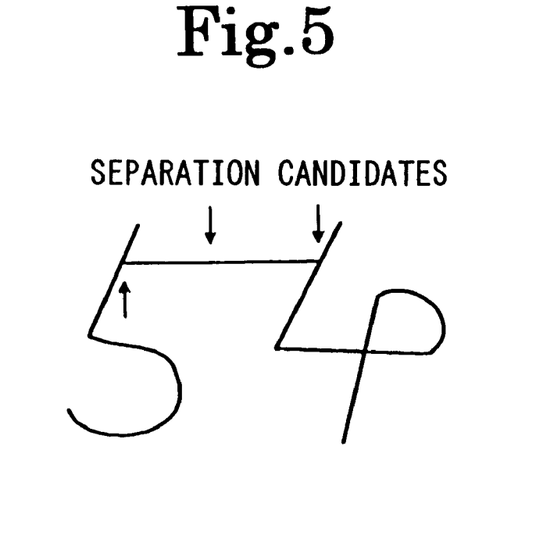
FIG. 5 is a contact character pattern for explaining the embodiment of the present invention.
Figure 6:
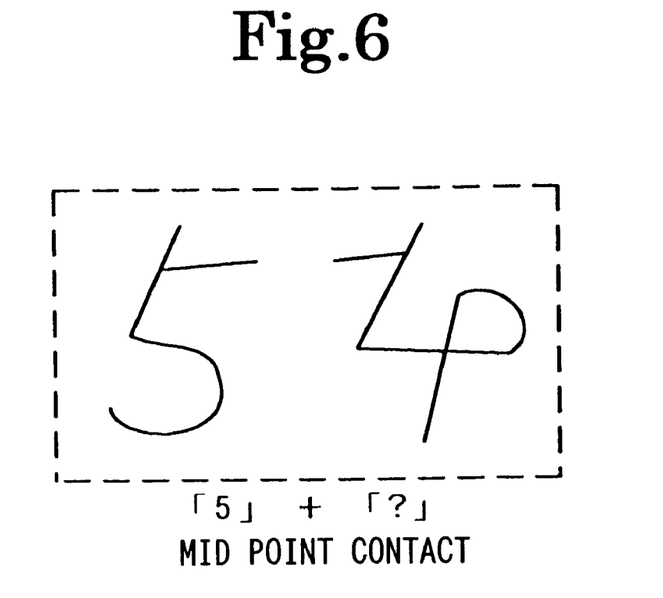
FIGS. 6 to 8 are recognition results for the separating position candidates.
Figure 7:
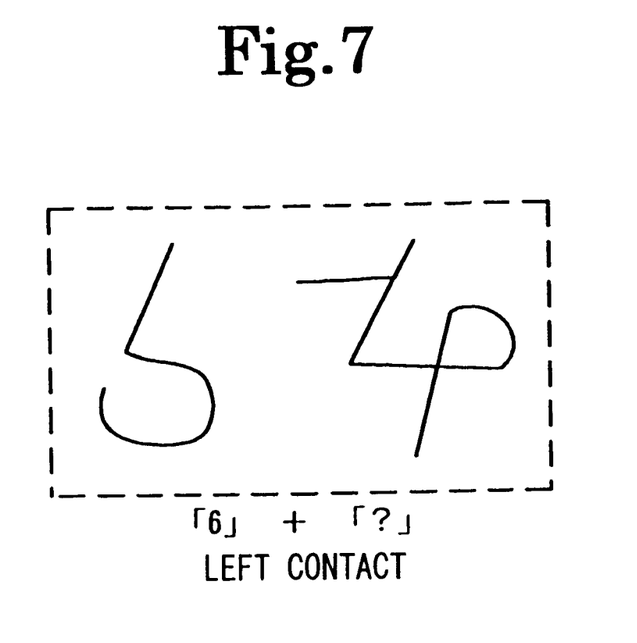
Figure 16:
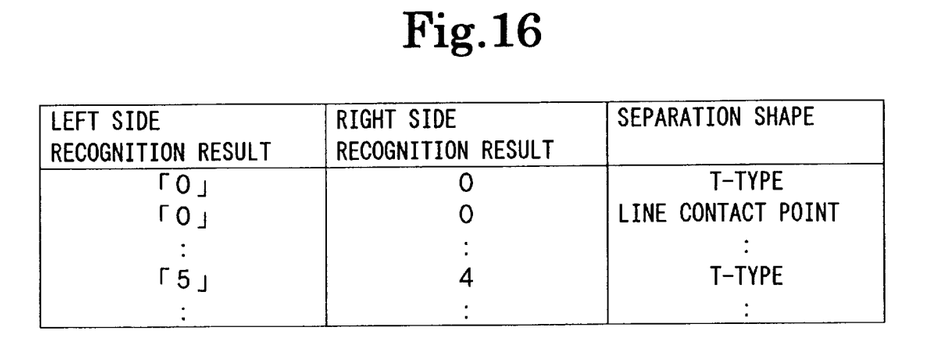
FIGS. 16 and 17 are examples of contact character data of two contact characters stored in the verification rule memory means 52.
Figure 17:
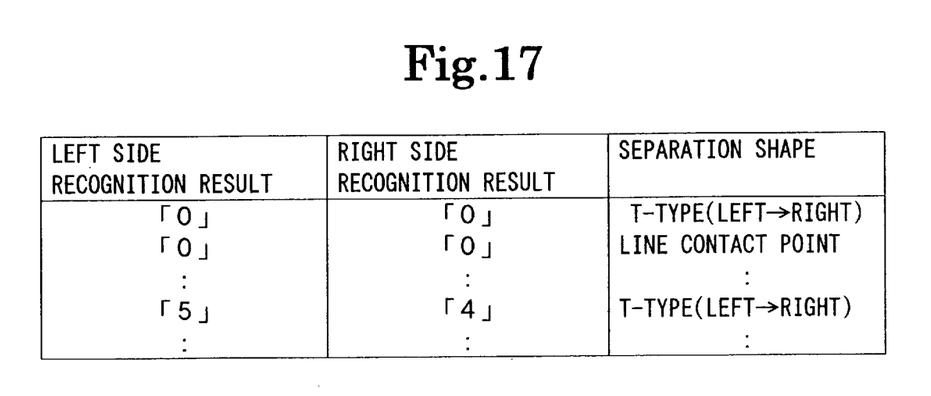

FIGS. 16 and 17 show examples of contact character data of two contact characters stored in the verification rule memory means 52. With this arrangement, a contact character pattern containing contact characters "54", as shown in FIG. 5 provides three separating position candidates as shown by arrows. These separating position candidates provide recognition results as shown in FIGS. 6 to 8, respectively.

Figure 8:
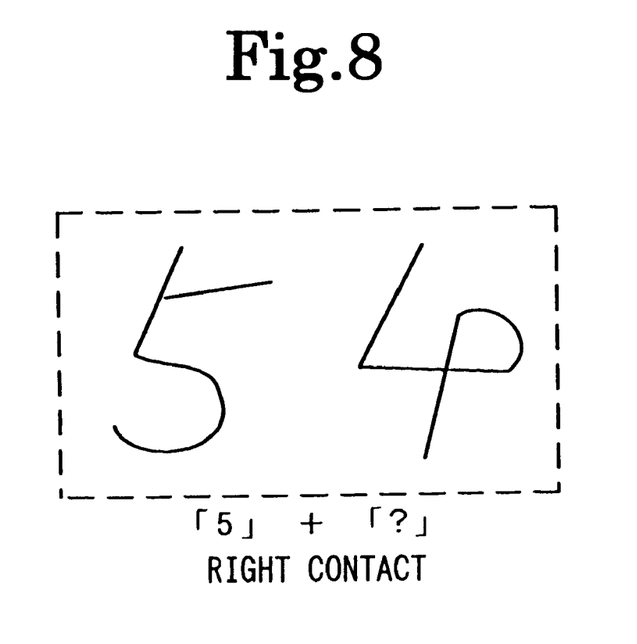
Figure 10:
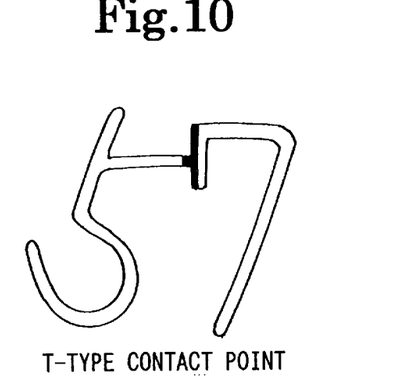
FIGS. 10 to 15 are examples of the separated character candidate patterns.
Figure 11:
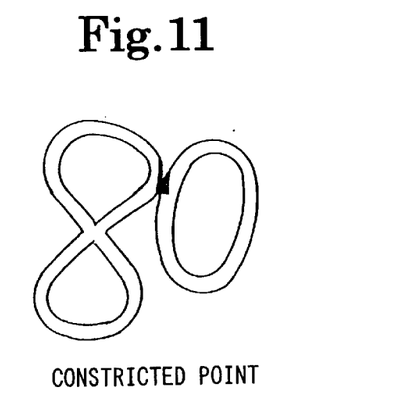
Figure 12:
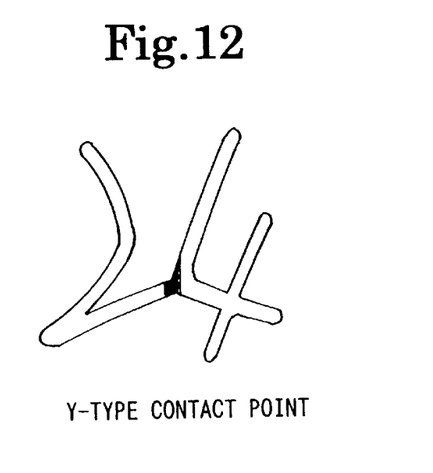
Figure 13:
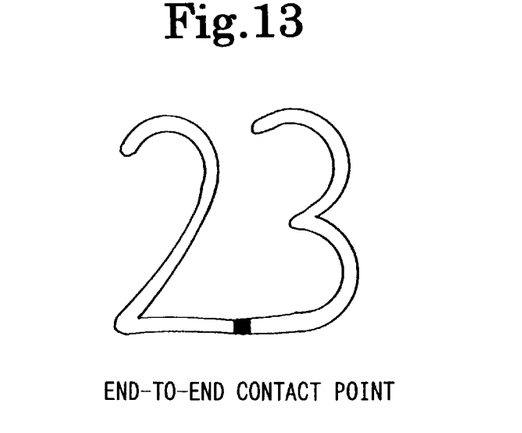

FIG. 16 shows data of the right final recognition results in the case of FIG. 8 allowable for being provided. The verification rules stored in the verification rule memory means 52, as shown in FIG. 16, are obtained by using the patterns as shown in FIGS. 10 to 15. Particularly, the T type and Y type contact points in the cases of FIGS. 10 and 12 are in run line strokes from right to left or from left to right, and thus data of the direction of contact from left to right or from right to left may be added to the data of these two different contact shapes. Where a plurality of allowable final recognition results are present, their reliability is calculated from character candidate pattern recognition result, and the highest reliability allowable final recognition result is provided as a first candidate. The reliability may be calculated as follows. For each read-out subject character kind stored in their character recognition dictionary 42, the feature vector distribution is approximated by one-dimensional or multiple-dimensional normalizing distribution function p(x), which is the reliability of feature vector X for the character candidate pattern. In the case where the discrimination adopts a k neighbor method (i.e., k-NN method), in which the majority of k recognition results are taken in the order of higher similarities to a teference vector, the quotient of division of the first candidate value by k may be made to be the reliability.

Figure 2:
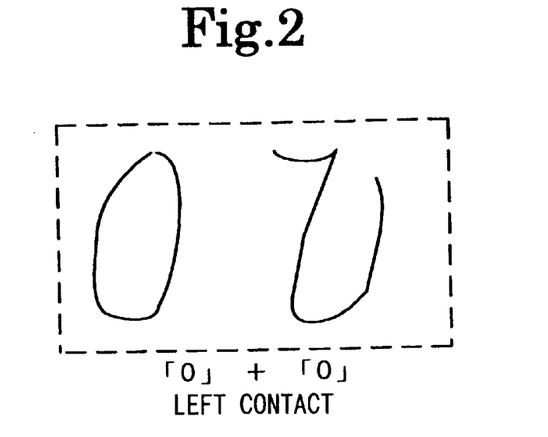
FIGS. 2 to 4 are possible separation points and separation shape data of the character patterns to be registered.
Figure 3:
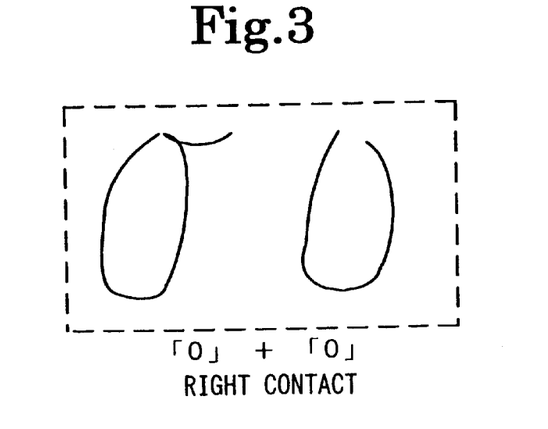
Figure 4:
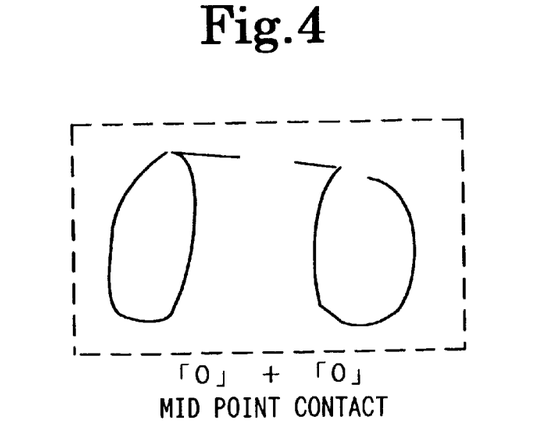

A second embodiment of the invention will now be described. In the first embodiment, reference patterns of recognition subject character kinds are stored in the character recognition dictionary 42. In the second embodiment, reference patterns are preliminarily produced from pattern models. More specifically, contact character patterns are used as pattern models, and separated character patterns obtained by using the contact pattern separation method described before and separation shape data obtained at the same time are stored. The features and the separation shape data of the character patterns to be registered are not absolutely determined by right separating positions, but all possible separating positions as shown in FIGS. 2 to 4 and corresponding separation shape data are stored.

Thus, when contact characters "00" as shown in FIG. 19 are inputted, recognition results concerning T type contact (from right to left), T type contact (from left to right) and mid point (end-to-end contact) are obtained, and three final recognition results are obtained. It is thus possible to obtain right recognition of contact character patterns even by using wrong separating positions. In this case, the final character recognition results may be provided as such when and only when they are all "00" and, for instance, registered in the verification rule memory means 52.

Figure 9:
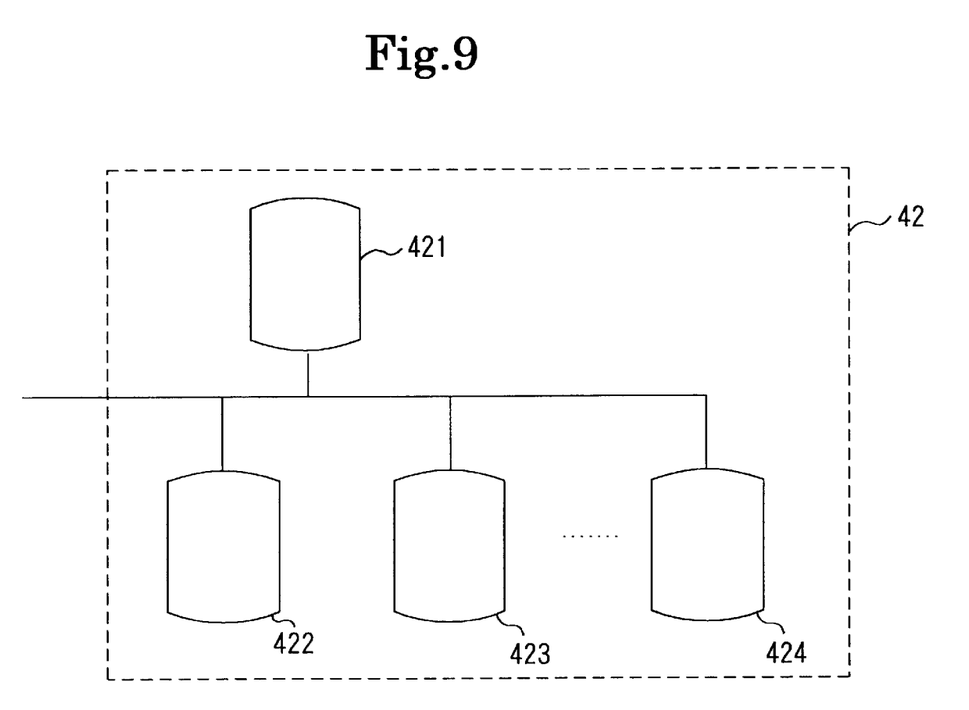
FIG. 9 is a block diagram of the character recognition dictionary 42.

As shown in FIG. 9, the character recognition dictionary 42 may comprise an index storage section 421 for storing storage positions of reference vectors of individual contact types and a plurality of reference vector storage sections 422 and 424 for storing individual separation shapes. In this case, the character recognition means 41 receiving a character candidate pattern from the character candidate separating means 31 and a separation shape from the separation shape detecting means 32 for pattern recognition, may discriminate the pattern without reference to the entire character recognition dictionary but by merely using the reference pattern of the pertinent separation shape.

As has been described in the foregoing, with the character recognition system according to the invention, when recognizing characters by detecting separating position candidates from a contact character row, only recognition results corresponding to registered recognition result/separation shape combinations are provided. It is thus possible to extremely reduce occasional erroneous character recognition due to wrong separation.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A character recognition system comprising:
    a first means for extracting a character row containing contact characters, detecting character separating position candidates in the derived character row and separating areas each corresponding to one character as character candidate patterns from the derived character row;
    a second means for determining the separation shape of each separated character candidate pattern; and a third means for determining the character kind from each separated character candidate and the corresponding separation shape, making a check, on the basis of the character recognition result of each character candidate pattern and the corresponding separation shape, as to whether the combination of the character recognition result and the separation shape is right, and providing the recognition result if the combination is right.

2. A character recognition system for detecting contact positions in a contact character pattern containing contact characters, separating character candidates from the contact character pattern at the contact positions thereof as separating positions, and determining the character kind of each character candidate in a character recognition unit, wherein:

the shapes of the separating positions are detected when separating the character candidates from the contact character pattern, a character recognition dictionary with reference patterns stored therein is used to provide a character kind and a separating position shape most resembling a reference pattern for each detected separating position shape, and for a combination of a character recognition result and the corresponding separation shape the recognition result is provided if the combination is right.

3. A character recognition system comprising:

a character row extraction means for extracting a character row containing contact characters;

a separating position candidate detecting means for detecting character separating position candidates in the character row derived by the character row deriving means;

a character candidate separating means for separating areas each corresponding to one character as character candidate patterns by selecting the separating position candidates detected by the separating position candidate detecting means;

a separation shape determining means for determining the separation shapes of the separating position candidates detected by the separating position candidate detecting means;

character recognition means for determining character kinds from the character candidate patterns separated by the character candidate separating means and the separation shapes determined by the separation shape determining means for the character candidate patterns;

a character recognition dictionary for storing reference patterns to be referred to for the character recognition for individual character kinds and separation shapes;

recognition result verifying means for making a check, using the character recognition dictionary and each character candidate pattern recognition result obtained in the character recognition means and the corresponding separation shape, as to whether the combination of the recognition result and the separation shape is right; and a verification rule memory means, in which right combinations of recognition results and separation shapes are stored for the character candidate patterns checked in the recognition result verifying means; wherein:

the character recognition means provides, for each separation shape, a character kind most resembling a reference pattern stored in the character recognition dictionary and the separation shape, with reference to the character recognition dictionary with the reference patterns stored therein; and the recognition result verifying means checks combinations of the contact character pattern recognition result provided from the character recognition means and the corresponding separation shapes with reference to the verification rule memory means with the right recognition result/separation shape combinations stored therein, and provides any pertinent combination as a recognition result.

4. The character recognition system according to claim 3, wherein not only right recognition result/separation shape combinations but also wrong recognition result/separation shape combinations are stored in the verification rule memory means, and the processing of recognition result verifying means is performed for not only right separating position candidates, but also a plurality of separating point candidates including the right one.

5. The character recognition system according to claim 3, wherein the character recognition dictionary has indexes each representing a reference pattern storage position for each separation shape obtained in the separating position candidate detecting means.

6. The character recognition system according to claim 3, wherein the separating position candidate detecting means detects points of change in the character Line pixel run length perpendicular to the character row as separating position candidates, and determines the corresponding separation shapes to be either (1) a run length portion having a suddenly increasing width, (2) a run line portion having increasing widths at the opposite ends, (3) a mid point portion on a run line portion longer than a predetermined length, (4) a run line portion, in which the width is increased beyond a constant multiple as one goes in the character row direction, or when one of the four different portions (1) to (4) are detected, (5)) run line portions leading from the uppermost and lowermost points of a loop detected from the contact character pattern, i.e., either a run line portion having a suddenly increasing width, a run length portion having increased widths at the opposite ends or mild point portion of run line portion longer than a predetermined length, these separation shapes being made to be different when they are detected from the right end toward the left end of the contact character pattern and when they are detected from the left end toward the right end.

7. The character recognition system according to claim 3, wherein the separating position candidate detecting means detects points of change in the character line pixel run length perpendicular to the character row as separating position candidates, and determines the corresponding separation shapes to be either (1) a run line portion having a suddenly increasing width, (2) a run line portion having increased widths at the opposite ends, (3) a mid point portion of a run line portion longer than a predetermined length, (4) a run line portion, in which the width is increased beyond a constant multiple as one goes in the character row direction, or when one of the four different portions (1) to (4) are detected, (5) run line portions leading from the uppermost and lowermost points of a loop detected from the contact character pattern, i.e., either a run line portion having a suddenly increasing width, a run length portion having increased widths at the opposite ends or mid point portion of a run line portion longer than a predetermined length, these separation shapes being made to be different when they are detected from the right end toward the left end of the contact character pattern and when they are detected from the left end toward the right end.

8. The character recognition system according to claim 3, wherein the separating position candidate detecting means 21 separates an area corresponding to one character, when the character row image is free from contact characters, positions of zero projection value obtained by projecting character row image perpendicularly to the direction of the character row is selected as separating positions.

9. The character recognition system according to claim 3, wherein the separating position candidate detecting means separates an area corresponding to one character, when characters intrude one another in an intricate fashion, areas having continuous character pixels is detected from a character image, and each made to constitute one character.

10. The character recognition system according to claim 3, wherein the separating position candidate detecting means separates an area corresponding to one character, and divides the contact character pattern at an adequate position or positions when character patterns are in contact with one another.

11. The character recognition system according to claim 3, wherein the separating position candidate is determined as a portion having a suddenly increasing width, a portion which is constricted at the center as separating means candidate, a portion having a suddenly increasing width in a predetermined range with respect to a certain horizontal position or a mid point of straight line portion longer than a predetermined length.

12. The character recognition system according to claim 3, wherein the character candidate separating means checks whether each separated block contains contact characters by determining a block whose width is greater than the product of multiplification of the character row height by a constant to be one containing contact characters.

13. The character recognition system according to claim 3, wherein the character candidate separating means estimates the number of contact characters contained in the block from the width thereof, and determines the number of separation times.

14. The character recognition system according to claim 13, the number of separation times is determined by dividing the block width or the character frame width by the character row height.

15. The character recognition system according to claim 3, wherein the reference patterns of recognition subject character kinds are preliminarily produced from pattern models.

16. The character recognition system according to claim 15, contact character patterns are used as pattern models, and separated character patterns obtained by using the contact pattern separation and separation shape data are stored.

* * * * *